(12) United States Patent
Shinkai et al.

(10) Patent No.: US 7,601,481 B2
(45) Date of Patent: Oct. 13, 2009

(54) MULTILAYER PHASE-CHANGE INFORMATION RECORDING MEDIUM, AND METHOD FOR RECORDING AND REPRODUCING USING THE SAME

(75) Inventors: Masaru Shinkai, Yokohama (JP);
Michiaki Shinotsuka, Hiratsuka (JP);
Hiroyuki Iwasa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 926 days.

(21) Appl. No.: 11/083,298

(22) Filed: Mar. 17, 2005

(65) Prior Publication Data
US 2005/0207331 A1 Sep. 22, 2005

(30) Foreign Application Priority Data
Mar. 19, 2004 (JP) .............................. 2004-080324

(51) Int. Cl.
*G11B 7/24* (2006.01)
(52) U.S. Cl. .................. 430/270.13; 430/945; 428/64.4; 428/64.5; 369/275.2; 369/275.5
(58) Field of Classification Search ........................ None
See application file for complete search history.

(56) References Cited

U.S. PATENT DOCUMENTS

| | | | |
|---|---|---|---|
| 5,298,305 A | | 3/1994 | Shinozuka et al. |
| 5,736,657 A | | 4/1998 | Ide et al. |
| 5,882,759 A | * | 3/1999 | Hirotsune et al. .......... 428/64.1 |
| 6,018,510 A | | 1/2000 | Abe et al. |
| 6,096,398 A | | 8/2000 | Yuzurihara et al. |
| 6,221,557 B1 | | 4/2001 | Harigaya et al. |

(Continued)

FOREIGN PATENT DOCUMENTS

JP  8-50739  2/1996

(Continued)

OTHER PUBLICATIONS

Machine translation of JP 2004-039039.*

(Continued)

*Primary Examiner*—Martin J Angebranndt
(74) *Attorney, Agent, or Firm*—Cooper & Dunham, LLP

(57) ABSTRACT

The object of the present invention is to provide a multilayer phase-change information recording medium comprises a substrate, and N layers of information layer (N represents an integral number of 2 or more), and each of the information layers comprises at least a recording layer in which information is recorded by irradiating laser beam to induce a phase change between crystalline phase and amorphous phase. The present invention is characterized in that when the information layer is disposed so that a first information layer, a second information layer, a third information layer . . . , and N information layer are disposed in this sequence from the laser beam irradiation side, at least one information layer other than the N information layer comprises a lower protective layer, a recording layer, an upper protective layer, a reflective layer, and a thermal diffusion layer disposed in this sequence from the laser beam irradiation side; the thermal diffusion layer comprises at least indium (In) and oxygen (O) and further comprises any one of titanium (Ti) and zirconia (Zr); and the atomic ratio of indium (In) to all the metal elements in the thermal diffusion layer, In/all the metal elements, is 0.75 to 0.9.

17 Claims, 3 Drawing Sheets

U.S. PATENT DOCUMENTS

| | | |
|---|---|---|
| 6,426,936 B1 | 7/2002 | Shinotsuka et al. |
| 6,652,948 B2 | 11/2003 | Shinotsuka |
| 6,801,240 B2 | 10/2004 | Abe et al. |
| 6,841,049 B2 | 1/2005 | Ito et al. |
| 6,846,611 B2 | 1/2005 | Yuzurihara et al. |
| 7,407,697 B2 * | 8/2008 | Nishihara et al. .......... 428/64.1 |
| 2003/0035360 A1 | 2/2003 | Shinotsuka et al. |
| 2003/0081537 A1 | 5/2003 | Shinotsuka |
| 2004/0001418 A1 | 1/2004 | Shinotsuka et al. |
| 2004/0027982 A1 * | 2/2004 | Hirotsune et al. ........... 369/284 |
| 2004/0037203 A1 | 2/2004 | Harigaya et al. |
| 2004/0115386 A1 | 6/2004 | Shinkai et al. |
| 2004/0136307 A1 | 7/2004 | Ito et al. |
| 2005/0084799 A1 * | 4/2005 | Yahagi et al. .......... 430/270.11 |

FOREIGN PATENT DOCUMENTS

| | | | |
|---|---|---|---|
| JP | 2702905 | | 10/1997 |
| JP | 2000-215516 | | 8/2000 |
| JP | 2000-222777 | | 8/2000 |
| JP | 2001-243655 | | 9/2001 |
| JP | 2001-355065 | * | 12/2001 |
| JP | 2002-298433 | | 10/2002 |
| JP | 2003-242687 | | 8/2003 |
| JP | 2004-5938 | | 1/2004 |
| JP | 2004-30843 | | 1/2004 |
| JP | 2004-39039 | | 2/2004 |
| JP | 2004-47034 | | 2/2004 |
| JP | 2004-47038 | | 2/2004 |
| WO | 03/069612 | * | 8/2003 |

OTHER PUBLICATIONS

Machine translation of JP 2004-005938.*
Noboru Yamada et al. (Apr. 2001) "Phase Change Material for Use in Rewritable Dual-layer Optical Disk Utilizing a Blue-violet Laser", Optical Data Storage Topical Meeting 2001, Santa Fe, New Mexico, pp. 22-23.

* cited by examiner laser beam laser beam laser beam laser beam laser beam laser beam

MULTILAYER PHASE-CHANGE INFORMATION RECORDING MEDIUM, AND METHOD FOR RECORDING AND REPRODUCING USING THE SAME

BACKGROUND

1. Technical Field

This disclosure relates to a multilayer phase-change information recording medium used for performing any one of recording and reproducing of information by means of laser beam irradiation, and a method for optical recording and reproducing using the multilayer phase-change information recording medium.

2. Description of the Related Art

A phase-change optical disc such as CD-RW (Compact Disc-Rewritable) (hereafter this may be referred to as "phase-change information recording medium", "optical information recording medium", and "optical recording medium") generally has the basic configuration in which a recording layer comprising a phase-change material is provided on a plastics substrate, and a reflective layer which improves the light absorbance and has thermal diffusion effect is formed on the recording layer to perform recording and reproducing of information by means of laser beam irradiation from the substrate side.

The above-noted phase-change material induces a phase change between crystalline conditions and amorphous conditions by heating through the use of laser beam irradiation and subsequent cooling, and after the material is rapidly heated, if quenched, the material becomes amorphous, and if slowly cooled, the material becomes crystalline. Phase-change information recording media apply the properties to recording and reproducing of information.

Also, a phase-change information recording medium usually comprises a lower protective layer (hereafter this may be referred to as "lower dielectric layer") provided between a substrate and a recording layer, and an upper protective layer (hereafter this may be referred to as "upper dielectric layer") provided between the recording layer and a reflective layer for preventing oxidation, transpiration, and deformation of the recording layer, which are caused by heating through laser beam irradiation. In addition, these protective layers respectively have a function for adjusting optical properties of the information recording medium by adjusting the thicknesses thereof. Further, the lower protective layer also has a function for preventing the substrate from getting soft due to heat induced at the time of recording to the recording layer.

With increases in information volume handled with computers and the like in recent years, the signal recording capacity of optical discs such as DVD-RAM (Digital Versatile Disc-Random Access Memory), DVD+RW (DVD-Rewritable) has increased, which is accelerating high-density recording of signal information. The recording capacity of CD is currently approx. 650 MB, and DVD currently has a storage capacity of approx. 4.7 GB. Further increases in demands for high-density recording can be expected. Examples of the methods for achieving high-density recording using such a phase-change information recording medium include shortening the used laser beam wavelength up to blue ray region or increasing the numerical aperture (NA) of the objective lens to be used for pickup in recording and reproducing to reduce the spot size of laser beam irradiated to the information recording medium.

As a method for increasing recording capacity of an optical disc by means of improving an information-recording medium itself, a bilayer phase-change information-recording medium has been proposed, which is produced by laminating information layers, each of which comprising at least a recording layer and a reflective layer, on single-sided of the substrate and by bonding these information layers with an ultraviolet curable resin and the like therebetween. (For instance, see Japanese Patent (JP-B) No. 2702905, Japanese Patent Application Laid-Open (JP-A) Nos. 2000-215516, 2000-222777, 2001-243655, and the like).

A separating layer which is the interfacing portion between two information layers (it may be referred to as "intermediate layer") has a function for separating two information layers optically and comprises a material that absorbs laser beam as little as possible, because laser beam used in recording and producing needs to reach as the innermost information layer as possible.

Any of the above-noted bilayer phase-change information recording media are characterized by the first information layers thereof, and a first protective layer and a second protective layer are provided in the first information layer, as in the case of single-layer phase-change information recording media. These bilayer phase-change information recording media are also disclosed on the page 22 of "Phase Change Material for Use in Rewritable Dual-layer Optical Disk Utilizing a Blue-violet Laser"—ODS2001 Technical Digest, but there are many problems with such media. For example, if an information layer disposed at the near side from the laser beam irradiation side (the first information layer) is not sufficiently transmitted by laser beam, it will be impossible to record information in the recording layer of the information layer disposed at the innermost side (the second information layer) and to reproduce the information. To solve this problem, it is conceivable to remove a reflective layer constituting the first information layer, to make a reflective layer ultrathin, or to form a recording layer constituting the first information layer ultrathin.

Recording by the above-noted phase-change information recording media is performed by means of laser beam irradiation to the phase-change material of the recording layer and by quenching the material to induce transformation from crystalline conditions to amorphous conditions then to form a mark. Therefore, there is a problem that if the reflective layer is removed or is made very thin up to around 10 nm, it becomes difficult to form an amorphous mark due to the reduced thermal diffusion effect. Especially, a Sb—Te eutectic recording material, which is one of the materials generally used for phase-change information recording media such as CD-RW, is known as an excellent material in that the outline of amorphous portion of a recording mark is clear, because the material has a higher erasing ratio and a higher recording sensitivity than a Ge—Sb—Te compound recording material.

However, in order for the above-noted Sb—Te eutectic recording material to be transformed to amorphous, the material needs to have a quenching configuration in which quenching in a shorter time is required, because the crystallization rate of Sb—Te eutectic recording material is faster than a Ge—Sb—Te compound recording material. Therefore, a Sb—Te eutectic recording material has a problem that forming a mark will be difficult with the configuration having a thin reflective layer.

On the other hand, a method for further providing a layer for assisting in the thermal diffusion function that has been carried out by a reflective layer (this may be referred to as "thermal diffusion layer") on the reflective layer using a nitride, a carbide or the like having a relatively greater thermal conductivity and a smaller light absorbance, was proposed for a single-layer phase-change information recording medium (Japanese Paten Application Laid-Open (JP-A) No.

08-50739) and a bilayer phase-change information recording medium (JP-A No. 2000-222777), and the like.

This method can be considered as an effective method for eliminating the above-mentioned disadvantages that occur when forming a reflective layer constituting the first information layer very thin.

However, these materials like nitride or carbide have a higher stress, so a formed thermal diffusion layer is subject to cracks. Consequently, this develops a problem that the optical disc itself with a thermal diffusion layer provided therein cannot get sufficient overwrite properties. In addition, in a next-generation optical disc such as Blue-ray Disk system which uses a blue-violet laser, a carbide material has a problem that it is impossible to increase the light transmittance of the first information layer, because a carbide has a high light absorbance particularly on the short-wavelength side.

Hence, a multi-layer phase-change information recording medium capable of keeping a high light transmittance even in the short-wavelength region, allowing a recording layer with three layers provided therein, and having the improved sensitivity even in the case of two-layer optical information recording medium, have not been is provided yet, and immediate presentation of such a recording medium is desired under the present situation.

SUMMARY

There are provided in this disclosure a high-capacity multilayer phase-change information recording medium which excels in overwrite properties and allows single-sided multilayer recording even when a blue-violet laser is used, and a method for recording and reproducing of information using the multilayer phase-change information recording medium.

A first aspect of this disclosure includes a multilayer phase-change information recording medium comprising a substrate and N layers of information layer, in which N represents an integral number of 2 or more, in which each of information layers comprises at least a recording layer in which information is recorded by laser beam irradiation to induce a phase change between crystalline phase and amorphous phase, in the multilayer phase-change information layer, when the information layers are disposed so that a first information layer, a second information layer, . . . , and N information layer are disposed in this sequence from the laser beam irradiation side, at least one information layer other than the N information layer comprises a lower protective layer, a recording layer, an upper protective layer, a reflective layer, and a thermal diffusion layer disposed therein in this sequence from the laser beam irradiation side, and the thermal diffusion layer comprises at least indium (In),oxygen (O), and at least any one of titanium (Ti) and zirconia (Zr). In the multilayer phase-change information recording medium according to this aspect, N layers of information layer (N represents an integral number of 2 or more) are provided on the substrate, each of the information layers comprises a recording layer made from a material capable or inducing a phase-change between crystalline conditions and amorphous conditions by means of laser beam irradiation and has an intermediate layer provided between each information layers to allow recording and reproducing of information, in which at least one information layer other than the information layer formed at the most inner side viewed from the incidence of laser beam for recording and reproducing comprises a lower protective layer, a recording layer, an upper protective layer, a reflective layer, and a thermal diffusion layer provided in this sequence, and the thermal diffusion layer comprises at least indium and oxygen and further comprises any one of titanium and zirconium as essential elements, and the atomic ratio of indium (In) to all the metal elements in the thermal diffusion layer (In/all the metal elements) is 0.75 to 0.9, and thereby allows providing a multilayer phase-change information recording medium which excels in overwrite properties and has an excellent recording sensitivity even when a laser wavelength of 350 nm to 700 nm being used.

A second aspect of this disclosure includes the multilayer phase-change information recording medium according to the above-mentioned first aspect, wherein the thermal diffusion layer is formed by sputtering a target which comprises $In_2O_3$ and at least any one of $ZrO_2$, and $TiO_2$.

A third aspect of this disclosure includes the multilayer phase-change information recording medium according to the above-mentioned second aspect, wherein the thermal diffusion layer is formed by sputtering a target which further comprises $SnO_2$.

A fourth aspect of this disclosure includes the multilayer phase-change information recording medium according to the above-mentioned first aspect, wherein the thickness of the thermal diffusion layer is 10 nm to 200 nm.

A fifth aspect of this disclosure includes the multilayer phase-change information recording medium according to the above-mentioned first aspect, wherein the recording layer in the information layer having the thermal diffusion layer comprises Sb and Te and further comprises at least one element selected from Ag, In, Ge, Se, Sn, Al, Ti, V, Mn, Fe, Co, Ni, Cu, Zn, Ga, Bi, Si, Dy, Pd, Pt, Au, S, B, C, and P.

A sixth aspect of this disclosure includes the multilayer phase-change information recording medium according to the above-mentioned first aspect, wherein the thickness of the recording layer is 3 nm to 15 nm.

A seventh aspect of this disclosure includes the multilayer phase-change information recording medium according to the above-mentioned first aspect, wherein the reflective layer in the information layer having the thermal diffusion layer comprises at least one element selected from Au, Ag, Cu, W, Al, and Ta.

An eighth aspect of this disclosure includes the multilayer phase-change information recording medium according to the above-mentioned first aspect, wherein the thickness of the reflective layer is 3 nm to 20 nm.

A ninth aspect of this disclosure includes the multilayer phase-change information recording medium according to the above-mentioned first aspect, wherein the lower protective layer and the upper protective layer comprise a mixture of ZnS and $SiO_2$.

In a multilayer phase-change information recording medium according to any of the above-mentioned second through eighth aspects, optimization of the reflectance, the recording sensitivity, and the light transmittance of individual layers (excluding the N layer) in accordance with the conditions for recording and reproducing of information, and excellence in recording and reproducing properties with respect to all the information layers can be provided.

A tenth aspect of this disclosure includes the multilayer phase-change information recording medium according to the above-mentioned first aspect, wherein the information recording medium further comprises a first substrate, a second substrate, a first information layer, and a second information layer, the first information layer and the second information layer are provided between the first substrate and the second substrate through an intermediate layer, the first information layer comprises a first lower protective layer, a first recording layer, a first upper protective layer, a first reflective layer, and a first thermal diffusion layer disposed in this sequence from the laser beam irradiation side, wherein the second information layer comprises at least a second lower protective layer, a second recording layer, a second upper protective layer, and a second reflective layer disposed in this sequence from the laser beam irradiation side. In the multilayer phase-change information recording medium according to this aspect, a bilayer phase-change information recording medium capable of optically separating the first information layer from the second information layer by means of an intermediate layer can be provided.

An eleventh aspect of this disclosure includes the multilayer phase-change information recording medium according to the tenth aspect above, wherein the light transmittance of the first information layer relative to a laser beam wavelength of 350 nm to 700 nm is 40% to 70%. In the multilayer phase-change information recording medium according to the tenth aspect above, a bilayer phase-change information recording medium having a good recording sensitivity in both the first information layer and the second information layer and having excellence in recording and reproducing properties can be provided.

A twelfth aspect of this disclosure includes the multilayer phase-change information recording medium according to the tenth aspect above, wherein the information recording medium further comprises a transparent layer disposed between the first substrate and the first lower protective layer. In the multilayer phase-change information recording medium according to this aspect, a bilayer phase-change information recording medium that can be easily manufactured even when the thickness of the first substrate being thin can be provided.

A thirteenth aspect of this disclosure includes the multilayer phase-change information recording medium according to the tenth aspect above, wherein the information recording medium further comprises a barrier layer disposed at least any one of between the first upper protective layer and the first reflective layer, and between the second upper protective layer and the second reflective layer. In the multilayer phase-change information recording medium according to this aspect, at bilayer phase-change information recording medium having excellence in storage reliability by preventing corrosion of the reflective layer can be provided.

A fourteenth aspect of this disclosure includes the multilayer phase-change information recording medium according to the tenth aspect above, wherein the thickness of the first substrate is 10 μm to 600 μm. In the multilayer phase-change information recording medium according to this aspect, recording and reproducing can be satisfactorily performed even when the numerical aperture (NA) of the objective lens is changed.

A fifteenth aspect of this disclosure includes a method for optical recording and reproducing using a multilayer phase-change information recording medium, which is characterized in that laser beam at a wavelength of 350 nm to 700 nm is irradiated from the first information layer side to individual information layers formed in the multilayer phase-change information recording medium in accordance with the above-mentioned first aspect to perform recording and reproducing of information by the irradiation of laser beam. In the method for optical recording and reproducing using the multilayer phase-change information recording medium according to this aspect, a high capacity of recording and reproducing is possible by using the multilayer phase-change information recording medium according to any one of items <1> and <11> above.

Thus, there is provided a multilayer phase-change information recording medium having excellence in overwrite properties and having an excellent recording sensitivity even when a laser at a wavelength of 350 nm to 700 nm is used.

Figure 1:
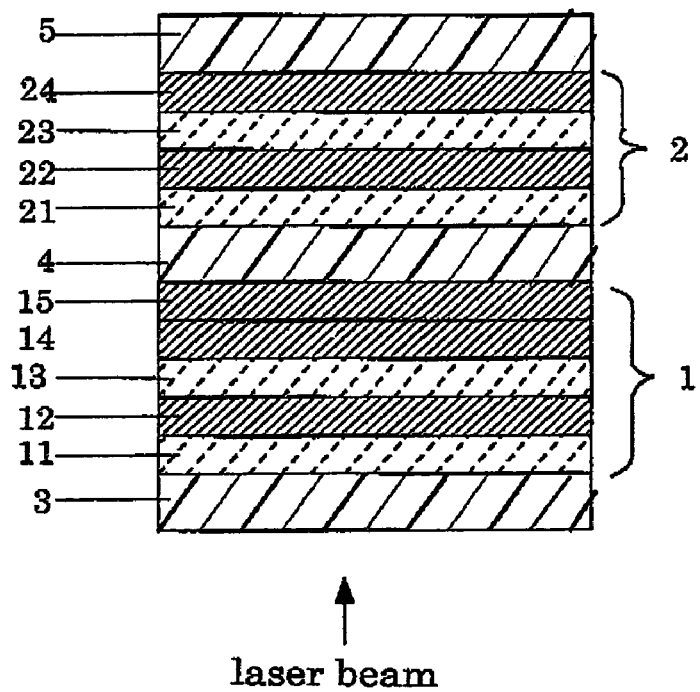
FIG. 1 is a cross-sectional view schematically shoring an example of the bilayer phase-change information recording medium according to the present invention.

DESCRIPTION OF THE PREFERRED EMBODIMENTS (Multilayer Phase-change Information Recording Medium)

A multilayer phase-change information recording medium according to the present invention comprises N layers of information layer (N represents an integral number of 2 or more), each of which comprising a recording layer in which information is recorded by means of laser beam irradiation to induce a phase change between crystalline conditions and amorphous conditions, and when the information layer is disposed so that a first information layer, a second information layer, a third information layer . . . , and N information layer are disposed in this sequence from the laser beam irradiation side, at least one information layer other than the N information layer comprises a lower protective layer, a recording layer, an upper protective layer, a reflective layer, and a thermal diffusion layer disposed therein in this sequence and further comprises other layers as required.

The thermal diffusion layer in at least one information layer other than the N information layer comprises at least indium (In) and oxygen (O) and further comprises at least any one of titanium (Ti) and zirconia (Zr) as required.

This is based on the reason that making the thermal diffusion layer comprise at least indium (In) and oxygen (O) and further comprise at least any of titanium (Ti) and zirconia (Zr) enables increased overwrite properties and enables an sufficient light transmittance to be assured especially in the short-wavelength region.

For materials having a good light transmittance and a good thermal conductivity, there has been $In_2O_3$ and $SnO_2$, and ITO in which $In_2O_3$ is mixed with $SnO_2$ (most frequently used ITO is a mixture of 5% by mass to 10% by mass $SnO_2$ with $In_2O_3$), known as a transparent conducting layer. These materials are put into practical use in liquid crystal displays or the like because of their goodness of patterning by means of etching as well as their small resistivity. However, in a device to which repetitive thermal history by laser beam is added, like information recording media, goodness of the transmittance of a specific wavelength used, excellent thermal properties, and toughness to thermal history are required, besides small resistivity. From the above-mentioned perspective, it is presumably considered that in addition to $In_2O_3$, by including Ti and Zr as a combination of materials, each of which is a wide band gap material having a low light absorbance in short-wavelength and a high melting point and excellent thermal properties, Ti or Zr can form the donor level, or oxygen holes are induced by Ti or Zr entered into the lattices.

Here, among a plurality of information layers stated above, the information layer formed at the most inner side far from the laser beam incidence side does not need transmission of beam. Since this can make the reflective layer thick, there is no need to provide a thermal diffusion layer therein, but if a thermal diffusion layer is provided on the recording layer located at the innermost side, the material constituting the thermal diffusion layer does not necessarily comprise at least indium (In) and oxygen (O) and further comprise at least any one of titanium (Ti) and zirconia (Zr), as described above.

The atomic ratio of indium (In) to all the metal elements in the thermal diffusion layer (In/all the metal elements, for example, In/(In+Ti), In/(In+Zr), In/(In+Ti+Zr)) is preferably ranging from 0.75 to 0.9. If the atomic ratio is less than 0.75, overwrite properties may lower due to the lowered thermal conductivity, and if more than 0.9, overwrite properties may deteriorate due to the lowered heat resistance.

The thermal diffusion layer is required to have a high thermal conductivity, since the recording layer subjected to laser beam irradiation will be quenched. The thermal diffusion layer is also required to have a low light absorbance in the laser wavelength so that the information layers located at inner side can be recorded and reproduced. In the wavelength of laser beam used for recording and reproducing of information, the extinction coefficient is preferably 0.5 or less, more preferably 0.3 or less. If the extinction coefficient is larger than 0.5, the light absorbance in the first information layer will increase, and this will make recording and reproducing of the second information layer difficult.

The thickness of the thermal diffusion layer is preferably 10 nm to 200 nm, more preferably 20 nm to 90 nm. If the thickness is less than 10 nm, heat dissipation effect may not be obtained, and if more than 200 nm, the stress may increase, and not only the repetitive recording properties may be degraded but also there may be a problem with mass productivity.

It is preferable that a recording layer in the information layer having the thermal diffusion layer comprises Sb and Te and further comprises at least one element selected from Ag, In, Ge, Se, Sn, Al, Ti, V, Mn, Fe, Co, Ni, Cu, Zn, Ga, Bi, Si, Dy, Pd, Pt, Au, S, B, C, and P.

The thickness of the recording layer is preferably 3 nm to 15 nm, and more preferably 5 nm to 10 nm. If the thickness is less than 3 nm, it may be difficult to make the recording layer even, and if more than 15 nm, the light transmittance tends to lower.

A reflective layer in the information layer having the thermal diffusion layer preferably comprises at least one element selected from Au, Ag, Cu, W, Al, and Ta.

The thickness of the reflective layer is preferably 3 nm to 20 nm, and more preferably 6 nm to 10 nm.

A lower protective layer and an upper protective layer respectively have effect of preventing deterioration and degeneration changes of the recording layer, improving adhesive strength of the recording layer as well as recording properties and the like. Examples of the materials of the lower protective layer and the upper protective layer include a metal oxide, such as SiO, $SiO_2$, ZnO, $SnO_2$, $Al_2O_3$, $TiO_2$, $In_2O_3$, MgO, $ZrO_2$; a nitride, such as $Si_3N_4$, AlN, TiN, BN, ZrN; a sulfide, such as ZnS, $In_2S_3$, $TaS_4$; a carbide, such as SiC, TaC, $B_4C$, WC, TiC, ZrC; a diamond-like carbon, or a mixture thereof. Among the above stated, a mixture of ZnS and $SiO_2$ is preferable. The mixture of ZnS and $SiO_2$ is suitable in that the mixture excels in heat resistance, low-thermal conductivity, and chemical stabilization, and the layer thereof has low residual stress, and is not subject to deterioration of the properties such as recording sensitivity and erasing ratio when repeatedly recorded and erased, and has excellent adhesiveness with recording layers.

Here, FIG. 1 is a cross-sectional view schematically showing an example of the bilayer information recording medium according to the present invention. The information recording medium comprises a first information layer 1, an intermediate layer 4, a second information layer 2, and a second substrate 5 disposed on a first substrate 3 in this sequence and further comprises other layers as necessary.

The first information layer 1 comprises a first lower protective layer 11, a first recording layer 12, a first upper protective layer 13, a first reflective layer 14, and a first thermal diffusion layer 15.

The second information layer 2 comprises a second lower protective layer 21, a second recording layer 22, a second upper protective layer 23, and a second reflective layer 24.

It is noted that a barrier layer may be respectively provided between the first upper protective layer 13 and the first reflective layer 14, and between the second upper protective layer 23 and the second reflective layer 24.

Figure 2:
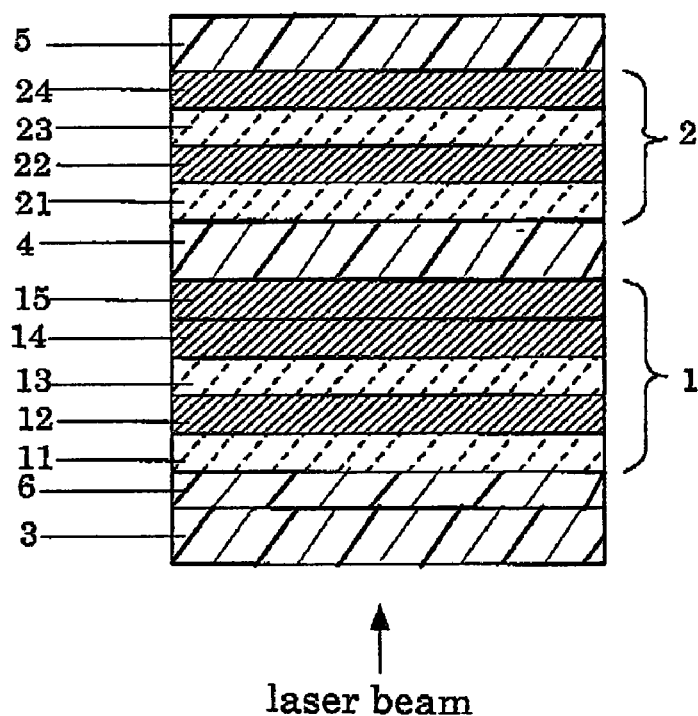
FIG. 2 is a cross-sectional view schematically showing another example of the bilayer phase-change information recording medium according to the present invention.

Also, as shown FIG. 2, a transparent layer 6 may be provided between the first substrate 3 and the first lower protective layer 11. For a transparent layer like this, a sheet-like material having a thin thickness is used as the first substrate 3, and the transparent layer will be provided on the first substrate 3 when the manufacturing method differs from that of the information recording medium shown FIG. 1.

First Substrate

The first substrate 3 should be enough to transmit the laser beam irradiated for recording and reproducing but can be selected from among the materials that have been well known in the art, as required.

For materials for the first substrate, a glass, a ceramic, a resin and the like are usually used, and a resin is suitable in terms of formability and cost.

Examples of the resin include a polycarbonate resin, an acrylic resin, an epoxy resin, a polystyrene resin, an acrylonitrile-styrene copolymer resin, a polyethylene resin, a polypropylene resin, a silicone resin, a fluorine-contained resin, an ABS resin, and a polyurethane resin. Among these resins, it is preferable to use a polycarbonate resin and an acrylic resin, such as polymethyl methacrylate (PMMA), which have excellence in terms of formability, optical properties, and cost.

On the surface of the first substrate 3 with the first information layer formed thereon, a pattern of concavo-convex may be formed as required, which is grooves in the form of spiral or concentric grooves for tracking of laser beam and is usually referred to as a groove section and a land section. The grooves will be usually formed by an injection molding method or a photopolymer method and the like.

The thickness of the first substrate 3 is preferably from approx. 10 μm to 600 μm.

For a material of the second substrate 5, a material same as the first substrate 3 may be used, but a material opaque to laser beam used in recording and reproducing may be used, and the material to be used for the second substrate 5 may differ in quality and the shape of grooves from those of the first substrate 3. There is no particular limitation on the thickness of the second substrate 5, and the thickness can be selected in accordance with the intended use, however, it is preferable to select the thickness of the second substrate so that the total of thickness of the first substrate 3 and the second substrate 5 is 1.2 mm.

Intermediate Layer and Transparent Layer

It is preferable that the intermediate layer 4 and the transparent layer 6 respectively have a low light absorbance in the wavelength of laser beam irradiated for recording and reproducing. For the materials, a resin is preferable in terms of moldability and cost, and an ultra curable resin, a slow-acting resin, a thermoplastic resin or the like can be used.

The second substrate 5 and the intermediate layer 4 may have concavo-convex patterns, such as grooves and guide grooves, formed thereon by an injection molding method, a photopolymer method, and the like, as in the first substrate 3.

The intermediate layer 4 is the one that the first information layer can be differentiated from the second information layer by a pickup to optically separate the first information layer from the second information layer at the time of recording and reproducing of information, and the thickness of the intermediate layer 4 is preferably 10 μm to 70 μm. If the thickness of the intermediate layer 4 is thinner than 10 μm, interlaminar cross-talks will occur, and if thicker than 70 μm, spherical aberrations occur when recording and reproducing the second information recording layer, and the recording and reproducing tend to become difficult.

There is no limitation on the thickness of the transparent layer 6, and the thickness can be selected in accordance with the intended use, but the thicknesses of the first substrate 3 and the transparent layer 6 should be adjusted so that an optimal thickness of the first substrate 3 in the optical information recording medium prepared by the manufacturing method with no transparent layer 6 provided therein as shown in FIG. 1 can be equivalent to the total of thicknesses of the substrate 3 and the transparent layer 6 of the optical information recording medium as shown in FIG. 2, which is manufactured by a different method from FIG. 1. For example, if satisfactory recording and erasing performance can be obtained when the numerical aperture (NA) being 0.85 and the thickness of the first substrate 3 of the optical information recording medium in FIG. 1 being 100 μm, then when the thickness of the first substrate 3 of the optical information recording medium in FIG. 2 being 50 μm, it is preferable to determine the thickness of the transparent layer 6 as 50 μm.

First Recording Layer and Second Recording Layer

As for the material of the first recording layer 12 and the second recording layer 22, both recording layers comprise a material capable of inducing a phase change between crystalline and amorphous by heating through laser beam irradiation and cooling. There is no particular limitation on the material, and the material can be selected from among the materials that have been well known in the art, as required. Examples of the material of the first and second recording layers include a chalcogen alloy, such as Ge—Te, Ge—Te—Sb, Ge—Sn—Te; and a Sb—Te eutectic thin film. Among the above materials, a Sb—Te eutectic material is particularly preferable in terms of recording (transformation-to-amorphous) sensitivity, recording velocity, and erasing ratio.

It is preferable to add other elements or impurities, such as Ag, In, Ge, Se, Sn, Al, Ti, V, Mn, Fe, Co, Ni, Cu, Zn, Ga, Bi, Si, Dy, Pd, Pt, Au, S, B, C, and P to these materials for the first recording layer 12 and the second recording layer 22 for the purpose of further improvements in performance and recording reliability and the like.

These recording layers can be formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers.

With respect to the first recoding layer 12, there is no limitation on the thickness, and the thickness can be selected in accordance with the intended use, but the thickness of the first recording layer is preferably 3 nm to 15 nm. If the thickness is less than 3 nm, it may be difficult to make the layer even, and if more than 15 nm, the light transmittance tends to lower.

With respect to the second recoding layer 22, there is no limitation on the thickness, and the thickness can be selected in accordance with the intended use, but the thickness of the second recording layer is preferably 3 nm to 25 nm. If the thickness is less than 3 nm, it may be difficult to make the layer even, and if more than 25 nm, it is not preferable, as the recording sensitivity tends to lower.

First Reflective Layer and Second Reflective Layer

The first reflective layer 14 and the second reflective layer 24 have functions for effectively using incoming laser beam and making the cooling rate improved and to make transformation-to-amorphous easier to be induced. Therefore, a metal having a high thermal conductivity is usually used for these reflective layers. Examples of the metal material of the first and second reflective layers include Au, Ag, Cu, W, Al, Ta, and an alloy made with the above noted metals, and other elements can be further added to the metal material as required. The elements to be added the above noted metal materials are preferably Cr, Ti, Si, Pd, Ta, Nd, Zn and the like.

Among these materials, a material made from Ag is suitable for the material used especially for the reflective layer in the first information layer of a multilayer information recording medium, as in the present invention, since an Ag material has a low reflective index of "n" being 0.5 or less even in a blue-wavelength region and enables a light absorbance to be reduced to low levels.

The above-noted reflective layers can be formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers.

In this case, a high light transmittance is required for the first information layer 1, therefore, for the first reflective layer 14 it is preferable to use Ag having a low reflective index and a high thermal conductivity or an alloy maid with Ag.

The thickness of the first reflective layer 14 constituting the first information layer 1 is preferably 3 nm to 20 nm. If the thickness of the first reflective layer 14 is less than 3 nm, it may be difficult to make the layer evenly and precisely. If the thickness is more than 20 nm, the light transmittance will lower, and it may be difficult to record and reproduce the second information layer 2.

Also, the thickness of the second reflective layer 24 constituting the second information layer 2 is preferably 50 nm to 200 nm, more preferably 80 nm to 150 nm. If the thickness of the second reflective layer 24 is less than 50 nm, the repetitive recording properties may lower, and if more than 200 nm, it is not preferable because the recording sensitivity tends to lower.

First Lower Protective Layer and Second Lower Protective Layer

Functions and materials for the first lower protective layer 11, the second lower protective layer 21, the first upper protective layer 13 and the second upper protective layer 23 are same as in the case of a single layer phase-change information recording medium, and have effect of preventing deterioration and degeneration changes of the first recording layer 12 and the second recording layer 22, and improving the adhesive strength with recording layers as well as the recording properties. Examples of the materials for the first and second lower protective layers and the first and second upper protective layers include a metal oxide, such as SiO, $SiO_2$, ZnO, $SnO_2$, $Al_2O_3$, $TiO_2$, $In_2O_3$, MgO, $ZrO_2$; a nitride, such as $Si_xN_4$, AlN, TiN, BN, ZrN; a sulfide, such as ZnS, $In_2S_3$, $TaS_4$; a carbide, such as SiC, TaC, $B_4C$, WC, TiC, ZrC; a diamond-like carbon (DLC), or a mixture thereof.

One of these materials can be formed alone as a protective layer, and a mixture of these materials may be formed. These materials may alos include impurities when the necessity arises.

The melting points of these protective layers, 11, 21, 13 and 23 should be higher than those of the recording layers. Specifically, a mixture of ZnS and $SiO_2$ is the most preferable in this perspective.

These protective layers can be formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers.

The thickness of the first lower protective layer 11 and the second lower protective layer 21 is preferably 30 nm to 200 nm. Within this range of thickness, the thicknesses of the lower protective layers can be designed so as to become an optimal reflectance. If the thickness of the first and second lower protective layers 11 and 21 is less than 30 nm, the first substrate 3 and the intermediate layer 4 are possibly deformed by heat at the time of recording, and if more than 200 nm, this may develop a problem with the mass productivity.

Also, the thickness of the first upper protective layer 13 and the second upper protective layer 23 is preferably 3 nm to 40 nm. If the thickness of the first and second upper protective layers is less than 3 nm, the recording sensitivity may lower, and if more than 40 nm, there may be cases where heat dissipation effect does not occur.

The multilayer phase-change information recording medium according to the present invention may have a barrier layer between the upper protective layer and the reflective layer. For the material of the reflective layer, an Ag alloy is the most suitable, and for the material of the upper protective layer, a mixture of ZnS and $SiO_2$ is the most preferable, but if these two layers are adjacent to each other, sulfur in the upper protective layer has the potential to corrode Ag in the reflective layer, and the storage reliability is possibly lowered. To remove these problems, when an Ag-contained material is used for the reflective layer, it is preferable to provide a barrier layer between the upper protective layer and the reflective layer. The barrier layer should not include any sulfur but should have a melting point higher than that of the recording layer. Specifically, examples of materials for the barrier layer include a metal oxide, such as SiO, ZnO, $SnO_2$, $Al_2O_3$, $TiO_2$, $In_2O_3$, MgO, $ZrO_2$; a nitride, such as $Si_3N_4$, AlN, TiN, ZrN; a sulfide, such as ZnS, $In_2S_3$, $TaS_4$; a carbide, such as SiC, TaC, $B_4C$, WC, Tic, ZrC; or a mixture thereof. Barrier layers made from these materials are required to have a low light absorbance at the laser wavelength.

The barrier layer can be formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers.

The thickness of the barrier layer is preferably 2 nm to 10 nm. If the thickness is less than 2 nm, effect of preventing Ag corrosion may not be obtained, and this will cause decreases in the storage reliability. On the other hand, if thicker than 10 nm, there may be cases where heat dissipation effect cannot be obtained, and the light transmittance tends to lower.

First Thermal Diffusion Layer

The first thermal diffusion layer 15 is required to have a high thermal conductivity in order to quench the recording layer subjected to laser beam irradiation and also required to have a low light absorbance at the laser wavelength so that the inner side information layers can be recorded and reproduced. In the wavelength of the laser beam used for recording and reproducing information, the extinction coefficient is preferably 0.5 or less, and more preferably 0.3 or less. If the extinction coefficient is more than 0.5, the light absorbance in the first information layer will increase, and this will make recording and reproducing of the second information layer difficult.

The thermal diffusion layer, as mentioned above, has the above-noted function for a thermal diffusion layer by using materials mainly made from indium, oxygen, and at least any one of titanium and zirconium, to allow improvements in overwrite properties and to enable assuring a sufficient light transmittance particularly in the short-wavelength region.

The atomic ratio of indium (In) to all the metal elements in the thermal diffusion layer (In/all the metal elements) is preferably ranging from 0.75 to 0.9.

The thermal diffusion layer can be formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers.

The thickness of the first thermal diffusion layer 15 is preferably 10 nm to 200 nm. If the thickness is less than 10 nm, heat dissipation effect may not be obtained, and if more than 200 nm, the stress may increase, and not only the repetitive recording properties may lower but also there may be a problem with mass productivity.

It should be noted that there is no problem encountered even if a thermal diffusion layer according to the present invention is further provided between the first lower protective layer 11 and the first substrate 3 to improve the thermal diffusion effect.

Also, in the first information layer of the bilayer phase-change information recording medium of the present invention, the light transmittance at the laser wavelength used for recording and reproducing (for instance, the wavelength of 350 nm to 700 nm) is preferably 40% to 70%, and more preferably 40% to 60%. If the light transmittance is less than 40%, the recording properties of the semi-transparent recording layer 12 can be ensured because the light absorbance of laser beam energy to semi-transparent recording layer 12 increases, but it becomes difficult to ensure the recording properties of the second recoding layer 22 because incoming laser beam energy to the second recording layer 22 decreases. If the light transmittance is more than 70%, this makes it easier to ensure the recording properties of the second recoding layer 22 because incoming laser beam energy to the second recording layer 22 increases, but it may become difficult to ensure the recording properties of the semi-transparent recoding layer 12 because the light absorbance of laser beam energy to the semi-transparent recording layer 12 decreases.

It is noted that in a bilayer phase-change information recording medium in which recording has been performed after initialization, the recording layer has the amorphous area smaller than the area of the crystalline phase, therefore, the light transmittance based the amorphous phase may be smaller than the light transmittance based on the crystalline phase.

(Method for Manufacturing a Multilayer Phase-change Information Recording Medium)

Figure 3:
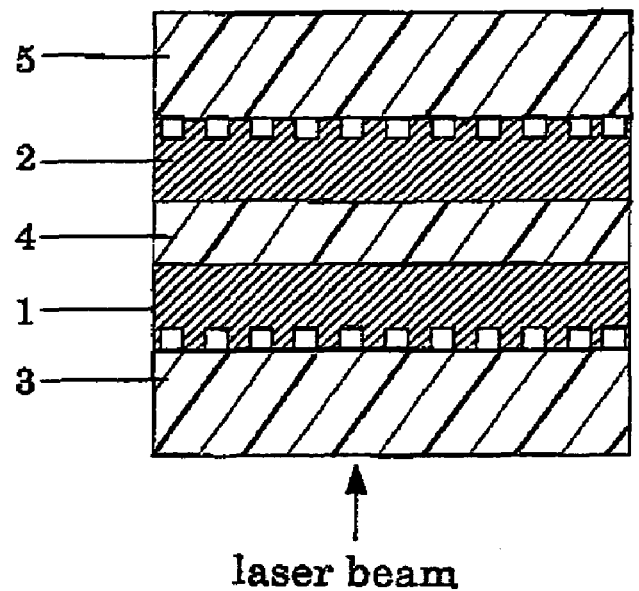
FIG. 3 is a cross-sectional view schematically showing the bilayer phase-change information recording medium according to the present invention in which grooves are provided on the first substrate and the second substrate.

Hereinafter, the method for manufacturing the phase-change information recording medium according to the present invention will be described in detail based on the accompanying drawings. An aspect of the method of manufacturing a bilayer phase-change information recording medium according to the present invention comprises a film-forming step, an initialization step, and a layer-adhesion step. Basically, each step will be performed in this sequence. FIG. 3 is a cross-sectional view schematically showing the bilayer phase-change information recording medium manufactured by the above-noted method, in which grooves are formed on the first substrate 3 and the second substrate 5.

In the film-forming step, the first information layer 1 formed on the surface of the first substrate 3 with grooves engraved thereon is separately produced from the second information layer 2 formed on the surface of the second substrate 5 with grooves engraved thereon.

The individual layers respectively constituting the first information layer 1 and the second information layer 2 are formed by various vapor growth methods, for example, a vacuum evaporation method, a sputtering method, a plasma CVD method, an optical CVD method, an ion plating method, an electron-beam deposition method or the like. Among these methods, a sputtering method excels in mass productivity and quality of layers. In a sputtering method, film-formation is generally performed with releasing an inert gas, such as an argon gas, and at that time, an reaction sputtering may be carried out while enriching the inert gas with oxygen, nitrogen and the like.

In the initialization step, full part of the first information layer 1 and the second information layer 2 are initialized by irradiating energy beam, such as laser beam, to the first information layer 1 and the second information layer 2, namely, the recording layers are made crystallized.

If a layer possibly gets loose by laser beam energy in the initialization step, the first and second information layers may be spin-coated with an UV curable resin and the like to be hardened by irradiating ultraviolet rays for over-coating before the initialization step. Also, after the subsequent layer-adhesion step is performed prior to the initialization step, the first information layer and the second information layer may be initialized by irradiating laser beam from the side of the first substrate.

Next, the first information layer 1 formed on the surface of the first substrate 3 and the second information layer 2 formed on the surface of the second substrate 5, which have been initialized as mentioned above, are disposed through the intermediate layer 4 while keeping the first information layer face to face with the second information layer. For instance, it is possible to spin-coat an ultraviolet curable resin that will be an intermediate layer on any one of the first substrate and the second substrate and to pressurize both substrates with these layer surfaces face to face each other to make one substrate bonded to another substrate and then to harden the resin by irradiating ultraviolet rays.

Figure 4:
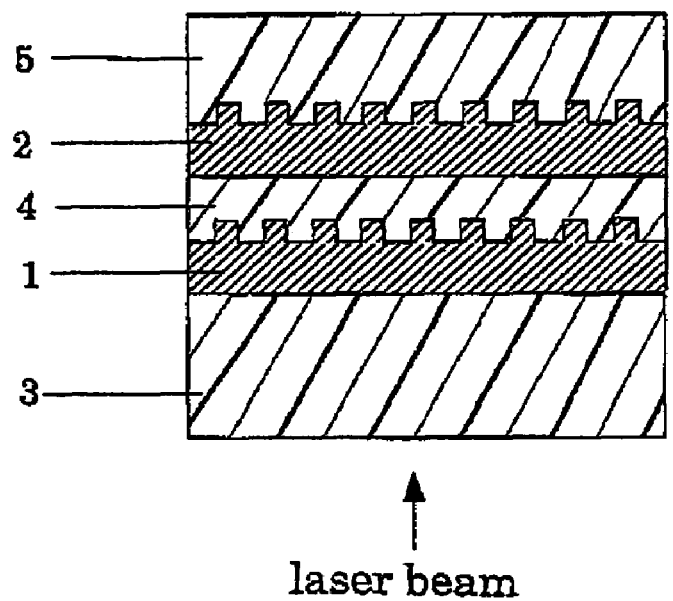
FIG. 4 is a cross-sectional view schematically showing the bilayer phase-change information recording medium according to the present invention in which grooves are provided on the first substrate and the intermediate layer.

A secondary aspect of the method for manufacturing a bilayer phase-change information recording medium according to the present invention comprises a first film-forming step, an intermediate layer forming step, a second film-forming step, a substrate laminating step, and an initialization step, and basically, each step will be performed in this sequence. FIG. 4 is a cross-sectional view schematically showing a bilayer phase-change information recording medium manufactured by this method, in which grooves are formed on the intermediate layer 4 and the second substrate 5.

The first film-forming step is a step for forming the second information layer 2 on the surface of the second substrate 5 with guide grooves engraved thereon. The film-forming method is as described above.

The intermediate layer forming step is a step for forming the is intermediate layer 4 with guide grooves engraved thereon on the second information layer 2. For example, it is possible to make grooves by applying an ultraviolet curable resin overall to the surface of the second information layer 2 and by irradiating ultraviolet rays while keeping a stamper made from a material capable of transmitting ultraviolet rays pressed against the resin, and by making the resin harden.

The second film-forming step is a step for forming the first information layer 1 on the intermediate layer 4. The film-forming method is as described above.

The substrate laminating step is a step for laminating the first information layer 1 and the first substrate 3 through the transparent layer 6. For example, it is possible to make the above-noted formation by spin-coating an ultraviolet curable resin, which is the material of the transparent layer 6, on any one of the information layer 1 and the first substrate 3 to dispose the first information layer 1 with the first substrate 3 and by irradiating ultraviolet rays to harden the resin. Besides, instead of forming the transparent layer 6, the first substrate 3 may be formed by applying a resin, which is the material of the first substrate 3, to the surface of the first information layer 1 and by hardening the resin.

This initialization step is a step for initializing full part of the first information layer 1 and the second information layer 2 by irradiating energy beam, such as laser beam, from the first substrate 3 to the first information layer 1 and the second information layer 2, namely, the recording layers are made crystallized. With respect to the second information layer 2, the initialization step may be performed upon completion of the step for forming the intermediate layer 4.

Figure 5:
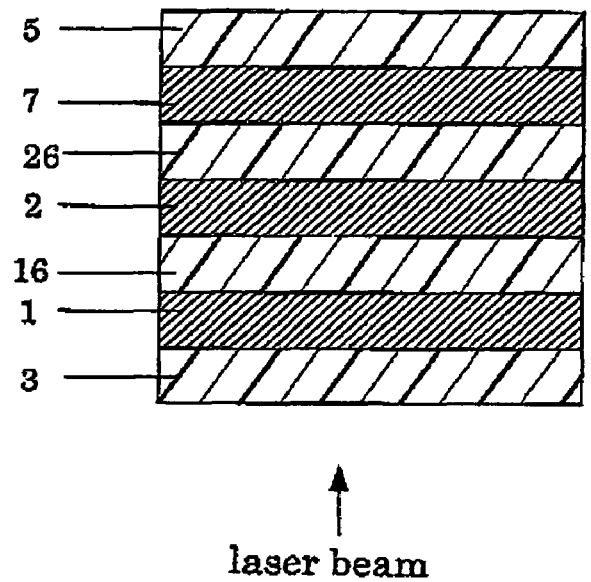
FIG. 5 shows an example of the phase-change information recording medium having three information layers according to the present invention.

The method for manufacturing a phase-change information recording medium having three information layers, as shown FIG. 5, comprises a first film-forming step, an intermediate layer forming step, a second film-forming step, a layer-adhesion step, and an initialization step, and further comprises other steps as required.

The first film-forming step is a step for forming the first information layer 1 on the first substrate 3 and forming the third information layer 7 on the second substrate 5. The intermediate layer forming step is a step for forming the second intermediate layer 26 on the third information layer 7 formed on the second substrate 5. The second film-forming step is a step for forming the second information layer 2 on the second intermediate layer 26 formed on the second substrate 5. The layer-adhesion step is a step for laminating the first substrate 3 and the second substrate 5 through the first intermediate layer 16 while keeping the first information layer 1 face to face with the second information layer. The initialization step is a step for initializing full part of the first information layer 1, the second information layer 2, and the third-information layer 7 by irradiating energy beam, such as laser beam, to these three information layers; namely, the recording layers are made crystallized. It is noted that the initialization step may be performed upon completion of forming individual information layers.

Figure 6:
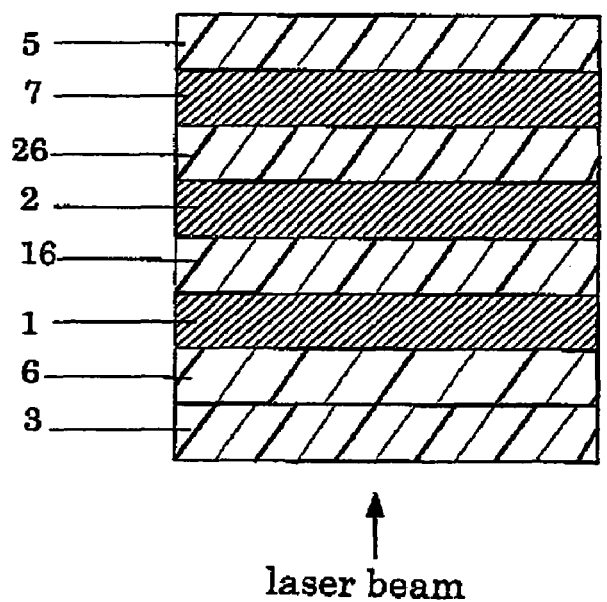
FIG. 6 shows another example of the phase-change information recording medium having three information layers according to the present invention according to the present invention.

In addition, the method for manufacturing a phase-change information recording medium having three information layers, as shown FIG. 6, comprises a first film-forming step, a first intermediate layer forming step, a second film-forming step, a second intermediate layer forming step, a third film-forming step, a first substrate laminating step, and an initialization step, and further comprises other steps as required.

The first film-forming step is a step for forming the third information layer 7 on the second substrate 5. The first intermediate layer forming step is a step for forming the second intermediate layer 26 on the third information layer 7. The second film-forming step is a step for forming the second information layer 2 on the second intermediate layer 26. The second intermediate layer forming step is a step for forming the first intermediate layer 16 on the second information layer 2. The third film-forming step is a step for forming the first information layer 1 on the first intermediate layer 16. The first substrate laminating step is a step for laminating the first substrate 3 and the first information layer 1 through the transparent layer 6. In the initialization step, the third information layer 7 may be initialized after the first film-forming step or upon completion of the film-formation of the second intermediate layer 26; the second information layer 2 may be initialized after the second film-formation step or upon completion of the film-formation of the first intermediate layer 16; and the first information layer 1 may be initialized after the third film-formation step.

(Method for Optical Recording and Reproducing Using the Multilayer Phase-change Information Recording Medium)

In the method for optical recording and reproducing using the multilayer phase-change information recording medium according to the present invention, recording and reproducing of information are performed by means of laser beam irradiation at a wavelength of 350 nm to 700 nm from the first information layer side to individual information layers in any of the above-mentioned multilayer phase-change information recording media according to the present invention.

In this case, when the information layers having a first information layer, a second information layer, . . . , and N information layer disposed in this sequence viewed from the laser beam incidence side, at least one information layer other than the N information layer comprises at least a lower protective layer, a recording layer, an upper protective layer, a reflective layer, and a thermal diffusion layer disposed thereon in this sequence, and the thermal diffusion layer preferably comprises at least indium (In) and oxygen (O), further comprises at least any one of titanium (Ti) and zirconia (Zr).

According to the method for optical recording and reproducing of the present invention, a large capacity of optical recording and reproducing is possible using the multilayer phase-change information recording medium according to the present invention.

Hereafter, the present invention will be described referring to specific examples; however, the present invention is not limited to the disclosed examples. On the contrary, the present invention is intended to cover various modifications and equivalent arrangements included within the spirit and scope of the appended claims.

EXAMPLE 1

Preparation of a Bilayer Phase-Change Information Recording Medium

First, as a preliminary experiment, a thermal diffusion layer is having a thickness of approx. 200 nm was prepared by using a $TiO_2$ and $In_2O_3$-sintered target and an argon (Ar) gas, as a film-forming gas, on a substrate made from a polycarbonate resin and by sputtering the target using a sheeting sputtering apparatus (manufactured by Balzers AG). The atomic ratio of indium (In) in this thermal diffusion layer, In/(In+Ti), was measured. For the measuring method, the composition of the thermal diffusion layer was obtained by the XPS (x-ray photoelectron spectroscopy analysis) and then the atomic ratio of indium, In/(In+Ti), was calculated based on the results of the composition. Table 1 shows the results.

A first lower protective layer containing ZnS and $SiO_2$ was formed on a first substrate made from a polycarbonate resin having a diameter of 12 cm, a thickness of 0.6 mm with tracking guides in the form of consecutive concavo-convex grooves engraved thereon by sputtering in the presence of an argon (Ar) gas by using a sheeting sputtering apparatus (manufactured by Balzers AG) so that the first lower protective layer has a thickness of 120 nm. A first recording layer containing $Ge_5Ag_1In_2Sb_{70}Te_{22}$ was formed on the first lower protective layer by sputtering so that the first recording layer has a thickness of 6 nm. A first upper protective layer containing ZnS and $SiO_2$ was formed on the first recording layer by sputtering so that the first upper protective layer has a thickness of 15 nm. A Ag—Zn—Al layer as a first reflective layer was formed on the first upper protective layer by sputtering so that the first reflective layer has a thickness of 10 nm. A first thermal diffusion layer was formed on the first reflective layer by using the target used in the preliminary experiment by sputtering so that the first thermal diffusion layer has a thickness of 120 nm.

Next, a Al—Ti layer as a second reflective layer was formed on the second substrate, which is same as the first substrate 1, by sputtering in the presence of an Ar gas so that the second reflective layer has a thickness of 120 nm. A second upper protective layer containing ZnS and $SiO_2$ was formed on the second reflective layer by sputtering so that the second upper protective layer has a thickness of 20 nm. A second recording layer containing $Ge_4Ag_1In_3Sb_{70}Te_{22}$ was formed on the second upper protective layer by sputtering so that the second recording layer has a thickness of 12 nm. A second lower protective layer containing ZnS and $SiO_2$ was formed on the second recording layer by sputtering so that the second lower protective layer has a thickness of 130 nm.

Here, the light transmittance of the first information layer at a wavelength of 405 nm was measured from the first substrate side using a spectrophotometer (Model 8110a, manufactured by SHIMADZU is Corp.).

Next, the initialization step was performed by means of laser beam irradiation to the first information layer and the second information layer respectively from the first substrate side and the second information layer side. Besides, the light transmittance of the first information layer at a wavelength of 405 nm was measured by using a spectrophotometer (Model 8110a, manufactured by SHIMADZU Corp.).

Next, an intermediate layer having a thickness of 35 μm was formed by applying an ultraviolet curable resin to the first information layer; laminating the second information layer formed on the second substrate with the first information layer by spin-coating, and by irradiating ultraviolet rays from the first substrate side to harden the ultraviolet resin.

With respect to the prepared bilayer phase-change information recording medium, jitters of the first information layer and the second information layer at a laser wavelength of 405 nm, a numerical aperture (NA) of 0.65, a linear velocity of 6.0 m/s, a track pitch of 0.43 µm, and a linear density of 0.18 µm/bit; and jitters of the first information layer and the second information layer after being overwritten hundred times were measured. The recording power (Pw) of which the jitter value of the second information layer becomes 9% or less was also measured. Table 1 shows the measurement results.

EXAMPLE 2

Preparation of a Bilayer Phase-Change Information Recording Medium

A bilayer phase-change information recording medium for Example 2 was prepared in the same manner as Example 1 except that a $ZrO_2$ and $In_2O_3$ sintered target was used for the thermal diffusion layer, and a mixed gas of an Ar gas and an oxygen gas ($Ar:O_2=10:0.2$ (volume ratio)) was used as a film-forming gas.

In addition, as a preliminary experiment, a thermal diffusion layer having a thickness of approx. 200 nm was prepared by using a $ZrO_2$ and $In_2O_3$-sintered target and a mixed gas of an argon (Ar) gas and an oxygen gas ($Ar:O_2=10:0.2$ (volume ratio)) as a film-forming gas, on a substrate made from a polycarbonate resin and by sputtering the target using a sheeting sputtering apparatus (manufactured by Balzers AG). The atomic ratio of indium (In) in this thermal diffusion layer, $In/(In+Zr)$, was measured. For the measuring method, the composition of the thermal diffusion layer was obtained by the XPS (x-ray photoelectron spectroscopy analysis) and then the atomic ratio of indium, $In/(In+Zr)$, was calculated based on the results of the composition. Table 1 shows the results.

With respect to the prepared bilayer phase-change information recording medium, likewise Example 1, jitters of the first information layer and the second information layer at a laser wavelength of 405 nm, a numerical aperture (NA) of 0.65, a linear velocity of 6.0 m/s, a track pitch of 0.43 µm, and a linear density of 0.18 µm/bit; and jitters of the first information layer and the second information layer after being overwritten hundred times were measured. Also, the recording power (Pw) of which the jitter value of the second information layer becomes 9% or less was measured. Table 1 shows the measurement results.

EXAMPLE 3

Preparation of a Bilayer Phase-Change Information Recording Medium

A bilayer phase-change information recording medium for Example 3 was prepared in the same manner as Example 1 except that a $TiO_2$, $In_2O_3$ and $SnO_2$-sintered target was used for the thermal diffusion layer, and a mixed gas of an Ar gas and an oxygen gas ($Ar:O_2=10:0.2$ (volume ratio)) was used as a film-forming gas.

In addition, as a preliminary experiment, a thermal diffusion layer having a thickness of approx. 200 nm was prepared by using a $TiO_2$, $In_2O_3$ and $SnO_2$-sintered target and a mixed gas of an argon (Ar) gas and an oxygen gas ($Ar:O_2=10:0.2$ (volume ratio)) as a film-forming gas, on a substrate made from a polycarbonate resin and by sputtering the target using a sheeting sputtering apparatus (manufactured by Balzers AG). The atomic ratio of indium (In) in this thermal diffusion layer, $In/(In+Ti+Sn)$, was measured. For the measuring method, the composition of the thermal diffusion layer was obtained by the XPS (x-ray photoelectron spectroscopy analysis) and then the atomic ratio of indium, $In/(In+Ti+Sn)$, was calculated based on the results of the composition. Table 1 shows the results.

With respect to the prepared bilayer phase-change information recording medium, likewise Example 1, jitters of the first information layer and the second information layer at a laser wavelength of 405 nm, a numerical aperture (NA) of 0.65, a linear velocity of 6.0 m/s, a track pitch of 0.43 µm, and a linear density of 0.18 µm/bit; and jitters of the first information layer and the second information layer after being overwritten hundred times were measured. Also, the recording power (Pw) of which the jitter value of the second information layer becomes 9% or less was measured. Table 1 shows the measurement results.

EXAMPLE 4

Preparation of a Bilayer Phase-Change Information Recording Medium

A bilayer phase-change information recording medium for Example 4 was prepared in the same manner as Example 1 except that Ag was used for the first reflective layer, and a barrier layer containing SiC having a thickness of 3 nm was provided between the first upper protective layer and the first reflective layer.

With respect to individual samples prepared, recording was performed under the same conditions as Example 1, and jitters of the first information layer and the second information layer were measured. To examine the storage reliability, the jitter of a 3T reproduction signal of the initial recording mark after storing the individual media respectively subjected to their initial recording under the conditions at 80° C. and 85% RH for 300 hours, was measured. The jitter value was 6.5%. Consequently, the result showed that when Ag is used for the first reflective layer, the sample of Example 4 with a barrier layer provided thereon also has a favorable post-storing jitter value of 6.7% and is excellent as an optical disk.

EXAMPLE 5

Preparation of a Bilayer Phase-Change Information Recording Medium

A second reflective layer made from Al and Ti was formed on the second-substrate made from a polycarbonate resin having a diameter of 12 cm, a thickness of 1.1 mm with tracking guides in the form of consecutive concavo-convex grooves engraved thereon by sputtering in the presence of an argon (Ar) gas so that the second reflective layer has a thickness of 120 nm. A second upper protective layer containing ZnS and SiO2 was formed on the second reflective layer by sputtering in the presence of an Ar gas so that the second upper protective layer has a thickness of 20 nm. A second recording layer containing $Ge_5Ag_1In_2Sb_{70}Te_{22}$ was formed on the second upper protective layer by sputtering in the presence of an Ar gas so that the second recording layer has a thickness of 12 nm. A second lower protective layer containing ZnS and $SiO_2$ was formed on the second recording layer by sputtering in the presence of an Ar gas so that the second lower protective layer has a thickness of 130 nm to form a second information layer.

On the second information layer formed as above, an intermediate layer having a thickness of 30μ with tracking guides in the form of consecutive concavo-convex grooves engraved thereon was formed by applying a resin to the second information layer by means of a 2P (photo polymerization) method. A thermal diffusion layer in which the same target as in Example 1 (an oxide target based on In/(In+Ti)=0.85) was used, was formed on the intermediate layer by sputtering in the presence of an Ar gas so that the thermal diffusion layer has a thickness of 120 nm. A Ag.Pd—Cu layer as a first reflective layer was formed on the thermal diffusion layer by sputtering in the presence of an Ag gas so that the first reflective layer has a thickness of 10 nm. A first upper protective layer containing ZnS and $SiO_2$ was formed on the first reflective layer by sputtering in the presence of an Ar gas so that the first upper protective layer has a thickness of 15 nn. A first recording layer containing $Ge_4Ag_1In_3Sb_{70}Te_{22}$ was formed on the first upper protective layer by sputtering in the presence of an Ar gas so that the first recording layer has a thickness of 6 nm. A first lower protective layer containing ZnS and $SiO_2$ was formed on the first recording layer by sputtering in the presence of an Ar gas so that the first lower protective layer has a thickness of 120 nm, then to form a first information layer. In addition, a first substrate made from a polycarbonate resin film having a diameter of 12 cm and a thickness of 50 μm was disposed on the first information layer through a transparent layer made from a two-sided adhesive sheet having a thickness of 45 μm to prepare a bilayer phase-change information recording medium.

Besides, for measurement of a light transmittance, a first information layer, a transparent layer, and the first substrate were provided on a substrate having a thickness of 1.1 mm, and the light transmittance from the first substrate side was measured.

The obtained light transmittance of the first information layer according to Example 5 with the wavelength before initialization at 405 nm was 48%, and the light transmittance after initialization was 55%. These light transmittances were measured by using a spectrophotometer (Model 8110a, manufactured by SHIMADZU Corp.).

With respect to the prepared optical recording medium, jitters of the first information layer and the second information layer at a wavelength of 405 nm, a numerical aperture (NA) of 0.85, a linear velocity of 6.5 m/s, a track pitch of 0.32 μm, and a linear density of 0.16 μm/bit; and jitters of the first information layer and the second information layer after being overwritten hundred times were measured, and both the first information layer and the second information layer were able to have favorable recording and reproducing results.

Also, other experimental productions exemplified that even when recording and reproducing is performed by a pickup at a numerical aperture (NA) of 0.85, the light transmittance of the first information layer should be 40% or more in order to favorably record and reproduce the second information layer.

On the ground of the above-mentioned, even if the numerical aperture (NA) of the objective lens is changed, the optical disc according to the present invention enables steady and favorable recording and reproducing by adjusting the thickness of the first substrate 1 within the range of 10 μm to 600 μm.

Other experimental productions also exemplified that steady and favorable recording and reproducing were possible in both the first information layer and the second information layer when the thickness of the recording layer in the first information layer being 3 nm to 15 nm, the thickness of the reflective layer being 3 nm to 20 nm, and the thickness of the thermal diffusion layer being 10 nm to 200 nm.

EXAMPLE 6

Preparation of a Bilayer Phase-Change Information Recording Medium

A lower protective layer containing ZnS and $SiO_2$ was formed on a first substrate made from a polycarbonate resin having a diameter of 12 cm, a thickness of 0.6 mm with tracking guides in the form of consecutive concavo-convex grooves engraved thereon by sputtering in the presence of an argon (Ar) gas by using a sheeting sputtering apparatus (manufactured by Balzers AG) so that the lower protective layer has a thickness of 50 nm. A first recording layer containing $Ge_5Ag_1In_2Sb_{70}Te_{22}$ was formed on the first lower protective layer by sputtering so that the first recording layer has a thickness of 6 nm. A first upper protective layer containing ZnS and $SiO_2$ was formed on the first recording layer by sputtering so that the first upper protective layer has a thickness of 15 nm. A Ag—Zn—Al layer as a first reflective layer was formed on the first upper protective layer by sputtering so that the first reflective layer has a thickness of 10 nm. A first thermal diffusion layer was formed on the first reflective layer by using the target used in the preliminary experiment in Example 1 by sputtering so that the first thermal diffusion layer has a thickness of 100 nm.

In addition, a similar substrate was prepared as a second substrate for Example 6. On the second substrate, a Al—Ti layer as a second reflective layer (80 nm), a second upper protective layer containing ZnS and $SiO_2$ (20 nm), a second recording layer containing $Ge_4Ag_1In_3Sb_{70}Te_{22}$ (12 nm), and a second lower protective layer containing ZnS and $SiO_2$ (80 nm) were formed in this sequence by sputtering in the presence of an Ar gas.

Here, the light transmittance of the first information layer at a wavelength of 660 nm was measured from the first substrate side using a spectrophotometer (Model 8110a, manufactured by SHIMADZU Corp.)

Next, the initialization step was performed by means of laser beam irradiation to the first information layer and the second information layer respectively from the first substrate side and the second information layer surface side. Here, the light transmittance of the first information layer at a wavelength of 660 nm was measured. Next, an intermediate layer was formed by applying an ultraviolet curable resin to the surface of the first information layer; laminating the first information layer with the second information layer formed on the second substrate by spin-coating, and by irradiating ultraviolet rays from the first substrate side to harden the ultraviolet curable resin. The thickness of the intermediate layer was 55 μm.

The light transmittance of the first information layer of Example 6 with the wavelength before initialization at 660 nm was 56%, and the light transmittance after initialization was 50%.

With respect to the prepared optical recording medium, jitters of the first information layer and the second information layer at a laser wavelength of 660 nm, a numerical aperture (NA) of 0.65, a linear velocity of 3.49 m/s, a track pitch of 0.74 μm, and a linear density of 0.267 μm/bit; and jitters of the first information layer and the second information layer after being overwritten hundred times were measured, and both the first information layer and the second information layer were able to have favorable recording and reproducing results.

COMPARATIVE EXAMPLE 1

Preparation of a Bilayer Phase-Change Information Recording Medium

A bilayer phase-change information recording medium for Comparative Example 1 was prepared in the same manner as in Example 1 except that a $SnO_2$ and $In_2O_3$-sintered target ($In_2O_3$:$SnO_2$=95:5) was used for the thermal diffusion layer.

With respect to the prepared optical recording medium, jitters of the first information layer and the second information layer at a laser wavelength of 405 nm, a numerical aperture (NA) of 0.65, a linear velocity of 6.0 m/s, a track pitch of 0.43 μm, and a linear density of 0.18 μm/bit; and jitters of the first information layer and the second information layer after being overwritten hundred times were measured. Also, the recording power (Pw) of which the jitter value of the second information layer becomes 9% or less was measured. Table 1 shows the measurement results.

Further, the measurement of the machine properties showed that the radial tilt exceeded 2.0° at the radius position of 35 mm and had a higher value compared to the radial tilt values in Examples 1 through 6—less than 1.5°. It is considered that this result shows that the internal stress of the $SnO_2$ and $In_2O_3$-sintered dielectric material is high.

COMPARATIVE EXAMPLE 2

Preparation of a Bilayer Phase-Change Information Recording Medium

A bilayer phase-change information recording medium for Comparative 2 was prepared in the same manner as Example 1 except that a mixture of $In_2O_3$ and $TiO_2$ generating a thermal diffusion layer having the value of In/(In+Ti) being 0.50 was used as the target for the thermal diffusion layer.

With respect to the prepared optical recording medium, the measurement was carried out as in Example 1. The initial jitter value worsened to 9.3%, further, the jitter value after rewritten hundred times exceeded 10%, and it was impossible even to measure the jitter value after rewritten thousand times. It was anticipated that quenching effect was decreased due to a decrease in electrical conductivity of the thermal diffusion layer. Then a layer having a thickness of 100 nm was prepared to evaluate the resistivity, and the resistivity had a high one-digit value. The light transmittance of the first information layer at that time was 55%.

COMPARATIVE EXAMPLE 3

Preparation of a Bilayer Phase-Change Information Recording Medium

A bilayer phase-change information recording medium for Comparative Example 3 was prepared in the same manner as Example 1 except that a mixture of $In_2O_3$ and $ZrO_2$ generating a thermal diffusion layer having the value of In/(In+Zr) being 0.50 was used as the target for the thermal diffusion layer.

With respect to the prepared optical recording medium, the measurement was carried out as in Example 1. The initial jitter value worsened to 9.8%, further, the jitter value after rewritten hundred times exceeded 10%, and it was impossible even to measure the jitter value after rewritten thousand times. It was anticipated that quenching effect was decreased due to a decrease in electrical conductivity of the thermal diffusion layer. Then a layer having a thickness of 100 nm was prepared to evaluate the resistivity, and the resistivity had a high one-digit value. The light transmittance of the first information layer at that time was 56%.

COMPARATIVE EXAMPLE 4

Preparation of a Bilayer Phase-Change Information Recording Medium

A bilayer phase-change information recording medium for Comparative Example 4 was prepared in the same manner as Example 1 except that a mixture of $In_2O_3$ and $TiO_2$ generating a thermal diffusion layer having the value of In/(In+Ti) being 0.95 was used as the target for the thermal diffusion layer.

With respect to the prepared optical recording medium, the measurement was carried out as in Example 1. The initial jitter value showed a favorable result of 7.6%, but the jitter value after rewritten hundred times became 9%, and it was impossible even to measure the jitter value after rewritten thousand times. It was anticipated that this result was induced by degradation of the overwrite properties due to a decrease in heat resistance. The light transmittance of the first information layer at that time was 52%.

COMPARATIVE EXAMPLE 5

Preparation of a Bilayer Phase-Change Information Recording Medium

A bilayer phase-change information recording medium for Comparative Example 5 was prepared in the same manner as Example 1 except that a mixture of $In_2O_5$ and $ZrO_2$ generating a thermal diffusion layer having the value of In/(In+Zr) being 0.95 was used as the target for the thermal diffusion layer.

With respect to the prepared optical recording medium, the measurement was carried out as in Example 1. The initial jitter value showed a favorable result of 7.6%, but the jitter value after rewritten hundred times exceeded 9%, and it was impossible even to measure the jitter value after rewritten thousand times. It was anticipated that this result was induced by degradation of the overwrite properties due to a decrease in heat resistance. The light transmittance of the first information layer at that time was 54%.

TABLE 1

| | Atomic Ratio of In | Transmission [%] Amorphous | Transmission [%] Crystalline | Pw [mW] of 2nd Info layer | Jitter after written one time [%] 1st Info layer | Jitter after written one time [%] 2nd Info layer | Jitter after rewritten 100 times [%] 1st Info layer | Jitter after rewritten 100 times [%] 2nd Info layer |
|---|---|---|---|---|---|---|---|---|
| Ex. 1 | 0.85 | 49 | 54 | ≧10.0 | 7.6 | 8.4 | 8.6 | 8.7 |
| Ex. 2 | 0.88 | 48 | 55 | ≧10.5 | 7.7 | 8.5 | 8.7 | 8.7 |
| Ex. 3 | 0.79 | 50 | 56 | ≧10.5 | 7.8 | 8.1 | 8.1 | 8.5 |
| Ex. 5 | 0.79 | 50 | 56 | ≧10.0 | 7.8 | 8.1 | 8.1 | 8.5 |

TABLE 1-continued

| | Atomic Ratio of In | Transmission [%] Amorphous | Transmission [%] Crystalline | Pw [mW] of 2nd Info layer | Jitter after written one time [%] 1st Info layer | Jitter after written one time [%] 2nd Info layer | Jitter after rewritten 100 times [%] 1st Info layer | Jitter after rewritten 100 times [%] 2nd Info layer |
|---|---|---|---|---|---|---|---|---|
| Ex. 6 | 0.79 | 50 | 60 | ≧10.0 | 7.8 | 8.1 | 8.1 | 8.5 |
| Compara. Ex. 1 | 0.95 | 46 | 50 | ≧13.0 | 7.6 | 8.7 | 8.9 | 9 |
| Compara. Ex. 2 | 0.5 | 46 | 55 | ≧10.0 | 9.3 | 8.7 | 10.2 | 9 |
| Compara. Ex. 3 | 0.5 | 48 | 56 | ≧10.5 | 9.8 | 8.5 | 16 | 8.7 |
| Compara. Ex. 4 | 0.95 | 46 | 52 | ≧12.5 | 7.6 | 8.7 | 9 | 9 |
| Compara. Ex. 5 | 0.95 | 48 | 54 | ≧13.0 | 7.8 | 8.6 | 9.5 | 8.8 |

The results of Table 1 shows that the bilayer phase-change information recording media in Examples 1 trough 3 according to the present invention respectively had a light transmittance of 54% or more, and showed their jitter values of both the first and the second information layers after written one time of 9% or less, which exemplifies their excellence as an optical disc. Also, recording and reproducing of the first recording layer and the second recording layer were enabled without any problems.

The bilayer phase-change information recording medium of Comparative Example 1 showed a light transmittance of 50% but required a recording power of the second information layer of 12 mW or more and found to be inferior to the media in Examples 1 through 3.

The bilayer phase-change information recording medium according to the present invention excels in overwrite properties, has a large capacity allowing single-sided multilayer recording even when blue-violet laser bean is used, and can be widely used in CD-R (Compact Disc-Recordable), CD-RW (Compact Disc-Rewritable), DVD+RW, DVD-RW(Digital Versatile Disc-Rewritable), DVD-RAM(Digital Versatile Disc-Random Access memory) and the like.

What is claimed is:

1. A multilayer phase-change information recording medium comprising:
   a substrate,
   and N layers of information layer, in which N represents an integral number of 2 or more,
   wherein each of information layers comprises at least a recording layer in which information is recorded by laser beam irradiation to induce a phase change between crystalline phase and amorphous phase,
   wherein when the information layers are disposed so that a first information layer, a second information layer, . . . , and N information layer are disposed in this sequence from the laser beam irradiation side, at least one information layer other than the N information layer comprises
   a lower protective layer,
   a recording layer,
   an upper protective layer,
   a reflective layer, and
   a thermal diffusion layer disposed therein in this sequence from the laser beam irradiation side,
   wherein the thermal diffusion layer comprises at least indium (In), oxygen (O), and at least any one of titanium (Ti) and zirconia (Zr), and
   wherein the atomic ratio of indium (In) to all the metal elements in the thermal diffusion layer, In/all the metal elements, is 0.75 to 0.85.

2. The multilayer phase-change information recording medium according to claim 1,
   wherein the thermal diffusion layer is formed by sputtering a target which comprises In2O3 and at least any one of ZrO2 and TiO2.

3. The multilayer phase-change information recording medium according to claim 2,
   wherein the thermal diffusion layer is formed by sputtering a target which further comprises SnO2.

4. The multilayer phase-change information recording medium according to claim 1,
   wherein the thickness of the thermal diffusion layer is 10 nm to 200 nm.

5. The multilayer phase-change information recording medium according to claim 1,
   wherein the recording layer in the information layer having the thermal diffusion layer comprises Sb and Te and further comprises at least one element selected from Ag, In, Ge, Se, Sn, Al, Ti, V, Mn, Fe, Co, Ni, Cu, Zn, Ga, Bi, Si, Dy, Pd, Pt, Au, S, B, C, and P.

6. The multilayer phase-change information recording medium according to claim 1,
   wherein the thickness of the recording layer is 3 nm to 15 nm.

7. The multilayer phase-change information recording medium according to claim 1,
   wherein the reflective layer in the information layer having the thermal diffusion layer comprises at least one element selected from Au, Ag, Cu, W, Al, and Ta.

8. The multilayer phase-change information recording medium according to claim 1,
   wherein the thickness of the reflective layer is 3 nm to 20 nm.

9. The multilayer phase-change information recording medium according to claim 1,
   wherein the lower protective layer and the upper protective layer comprise a mixture of ZnS and SiO2.

10. The multilayer phase-change information recording medium according to claim 1,
    wherein the information recording medium further comprises a first substrate, a second substrate, a first information layer, and a second information layer,
    wherein the first information layer and the second information layer are provided between the first substrate and the second substrate through an intermediate layer,
    wherein the first information layer comprises a first lower protective layer,
a first recording layer,
a first upper protective layer,
a first reflective layer,
and a first thermal diffusion layer disposed in this sequence from the laser beam irradiation side, and
wherein the second information layer comprises
at least a second lower protective layer,
a second recording layer,
a second upper protective layer,
and a second reflective layer disposed in this sequence from the laser beam irradiation side.

11. The multilayer phase-change information recording medium according to claim 10,
wherein the light transmittance of the first information layer relative to a laser beam wavelength of 350 nm to 700 nm is 40% to 70%.

12. The multilayer phase-change information recording medium according to claim 10,
wherein the information recording medium further comprises a transparent layer disposed between the first substrate and the first lower protective layer.

13. The multilayer phase-change information recording medium according to claim 10,
wherein the information recording medium further comprises a barrier layer disposed at least any one of between the first upper protective layer and the first reflective layer, and between the second upper protective layer and the second reflective layer.

14. The multilayer phase-change information recording medium according to claim 10,
wherein, the thickness of the first substrate is 10 μm to 600 μm.

15. The multilayer phase-change information recording medium of claim 1, wherein an extinction coefficient of the thermal diffusion layer is 0.5 or less in a wavelength of a laser beam used for recording and reproducing of information from the medium.

16. The multilayer phase-change information recording medium of claim 1, wherein said at least one information layer other than the N information layer further comprises a transparent layer disposed closer to the laser beam irradiation side than the lower protective layer.

17. A method for optical recording and reproducing comprising:
irradiating laser beam at a wavelength of 350 nm to 700 nm from the first information layer side to individual information layers formed in the multilayer phase-change information recording medium,
recording and reproducing information by the irradiation of laser beam,
wherein the multilayer phase-change information recording medium comprises
a substrate,
and N layers of information layer, in which N represents an integral number of 2 or more,
wherein each of information layers comprises at least a recording layer in which information is recorded by laser beam irradiation to induce a phase change between crystalline phase and amorphous phase,
wherein when the information layers are disposed so that a first information layer, a second information layer, . . . , and N information layer are disposed in this sequence from the laser beam irradiation side, at least one information layer other than the N information layer comprises
a lower protective layer,
a recording layer,
an upper protective layer,
a reflective layer, and
a thermal diffusion layer disposed therein in this sequence,
wherein the thermal diffusion layer comprises at least indium (In), oxygen (O), and at least any one of titanium (Ti) and zirconia (Zr), and
wherein the atomic ratio of indium (In) to all the metal elements in the thermal diffusion layer, In/all the metal elements, is 0.75 to 0.85.

* * * * *